July 12, 1966  C. W. SPINDLER  3,260,910

DUAL SPEED WINDING ARRANGEMENT

Filed July 16, 1962  2 Sheets-Sheet 1

INVENTOR.
CHARLES W. SPINDLER
BY
Albert F. Reuther
HIS ATTORNEY

July 12, 1966  C. W. SPINDLER  3,260,910
DUAL SPEED WINDING ARRANGEMENT
Filed July 16, 1962  2 Sheets-Sheet 2

| DATA | TURNS | | GAGE |
|---|---|---|---|
| | INNER | OUTER | |
| WINDING-A PORTION | 130 | 85 | #27 |
| WINDING-B PORTION | 110 | 105 | #28 |

INVENTOR.
CHARLES W. SPINDLER
BY
*Albert H. Reuther*
HIS ATTORNEY

United States Patent Office 3,260,910
Patented July 12, 1966

3,260,910
DUAL SPEED WINDING ARRANGEMENT
Charles W. Spindler, Kettering, Ohio, assignor to General Motors Corporation, Detroit, Mich., a corporation of Delaware
Filed July 16, 1962, Ser. No. 209,886
14 Claims. (Cl. 318—225)

This invention relates to winding arrangement for use with a slotted stator magnetic core and, more particularly, to obtaining two speed performance from a single speed permanent-capacitor stator winding arrangement.

An object of this invention is to provide a new and improved winding arrangement with a slotted stator magnetic core so that, in effect, it is possible to obtain two speed operation with only a switch and capacitor means used with a single speed motor.

Another object of this invention is to provide a winding arrangement for a single speed motor combined with only a switch and capacitor means for both single and two speed operation so that it becomes necessary for a manufacturer of appliances, air-moving devices such as furnaces, air conditioners and the like to stock only one type of single speed motor readily adapted to dual speed operation in accordance with the present invention.

Another object of this invention is to provide a single speed motor having components including only a main-running winding portion and a phase-starting winding portion arranged to have a capacitor means switched to be in series at all times with a portion thereof for realizing dual speed operation, in effect, from a single speed motor in which all components are active at all times.

A further object of this invention is to provide a pair of single speed motor windings arranged to have a differing number of wire turns, wire size or both and a capacitor means joined to one side of each thereof while an opposite side of each is connected to a source of power which optionally can be connected also to either side of the capacitor means by switching means for multi-speed as well as reversible operation.

Another object of this invention is to provide a six-pole concentric-coil twenty-four-slot stator winding arrangement for a normally single phase permanent-capacitor motor means in which a winding portion A including concentric coils each spanning slots arbitrarily numbered 1–5 (2–4), 5–9 (6–8), 9–13 (10–12), 13–17 (14–16), 17–21 (18–20) and 21–1 (22–24) as well as a winding portion B including concentric coils each spanning slots correspondingly arbitrarily numbered 3–7 (4–6), 7–11 (8–10), 11–15 (12–14), 15–19 (16–19), 19–23 (20–22) and 23–3 (24–2), respectively, of differing number of turns and/or wire size such that a capacitor means has opposite ends thereof connected to one end of each of the winding portions A and B though power supply is connected only to a common connection between winding portions A and B in a location removed from the capacitor means to which the power supply is alternately connected to opposite ends thereof to achieve dual speed operation from only a single speed winding arrangement.

Further objects and advantages of the present invention will be apparent from the following description, reference being had to the accompanying drawings wherein a preferred embodiment of the present invention is clearly shown.

Customarily, on a typical single-phase two-speed permanent-split capacitor type motor adapted for moving air in devices such as air conditioners, furnaces and the like, it has been necessary to provide an additional winding inserted in slots of the motor stator to supplement normal single speed running and starting windings used in the motor. Thus, previously it was deemed possible to obtain dual speed running operation by providing an auxiliary or phase-starting winding as well as a specific pair of main or running windings at least one of which was disconnected to remain dormant and inactive during running operation for one or another speed. On such previous dual speed motors it was necessary to convert from single speed motor designs to provide dual main windings with a corresponding change in physical stator slot structure to accommodate the additional conducting material, some of which actually would not be used at all times but rather, would be physically occupying space though inactive electrically during running operation at one of the speeds. The present invention provides for operation at both first and second speeds with a single speed motor means physically without the additional or secondary-speed winding inserted in the motor stator slots.

Figure 1:
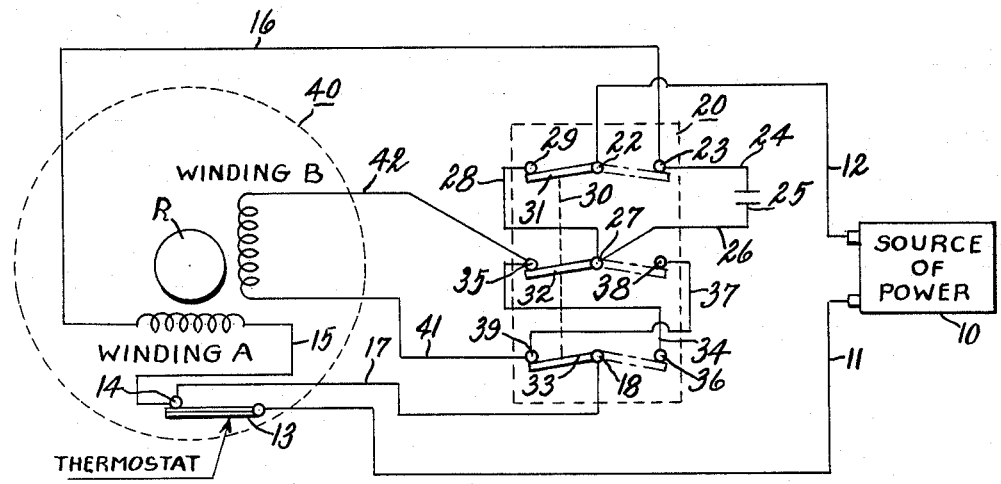
FIGURE 1 is a wiring diagram of a single speed motor with a winding arrangement and permanent capacitor means subject to switching for dual speed operation in accordance with the present invention.

In FIGURE 1 there is shown a source of power 10 from which line voltage can be supplied to leads or wiring connections 11 and 12. A suitable overload protector means or thermostat 13 can be provided in series with lead 11 to a juncture 14 representing a permanent internal interconnection of a lead 15 to one end of winding A having a lead or wiring connection 16 from an opposite end thereof and a lead or wiring connection 17 which extends from the junction 14 to a junction 18 of a switching device or three-pole double-throw switch means 20. The switch means 20 can provide additional junctures including the following. A juncture 22 has the lead or wire connection 12 thereto and a juncture 23 has the lead or wire 16 connected thereto. This juncture 23 provides a permanent connection between the lead or wire 16 and a connection 24 from one end of a capacitor means 25. An opposite end of this capacitor means 25 has a lead or wire connection 26 permanently secured to a juncture 27 with a cross connection 28 permanently to another juncture 29 of the switching device 20. A common cross link 30 can be carried by pivotal switch arms 31, 32 and 33 journalled as to junctures 22, 27 and 18, respectively, such that movement of the arm portion 31 can effect power supply of line voltage to alternate ends of the capacitor means 25 due to connection of a free end of the arm 31 to contact either juncture 23 or juncture 29.

The switching means 20 also provides permanent interconnection 34 between junctures 35 and 36. Another permanent switching interconnection 37 is provided between junctures 38 and 39. In addition to winding A noted earlier, a motor means generally indicated by numeral 40 includes a winding B and a rotor R. Windings A and B can be inserted as main and phase windings would normally be inserted for a single speed performance motor means. Wiring connections or leads 41 and 42 are brought out from opposite ends of the winding B as indicated in FIGURE 1. These two windings A and B are provided with differing number of turns, differing wire size or both.

Figure 2:
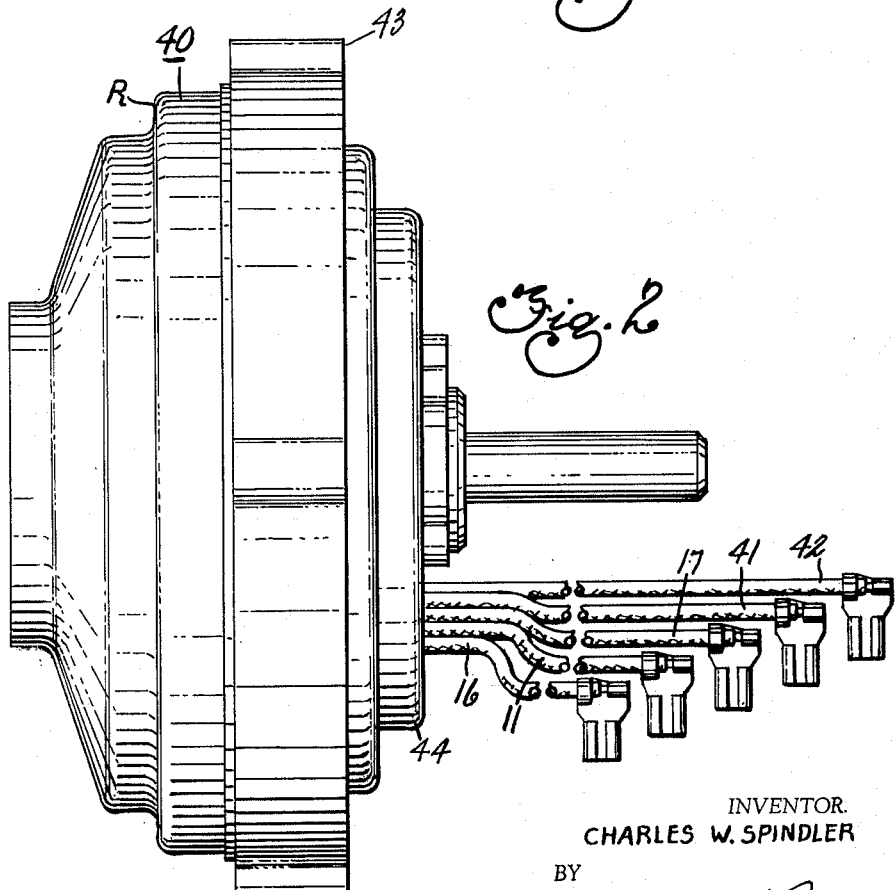
FIGURE 2 is a plan view of a single speed motor means having lead connections thereto for use in accordance with the wiring diagram of FIGURE 1.
Figures 3, 4:
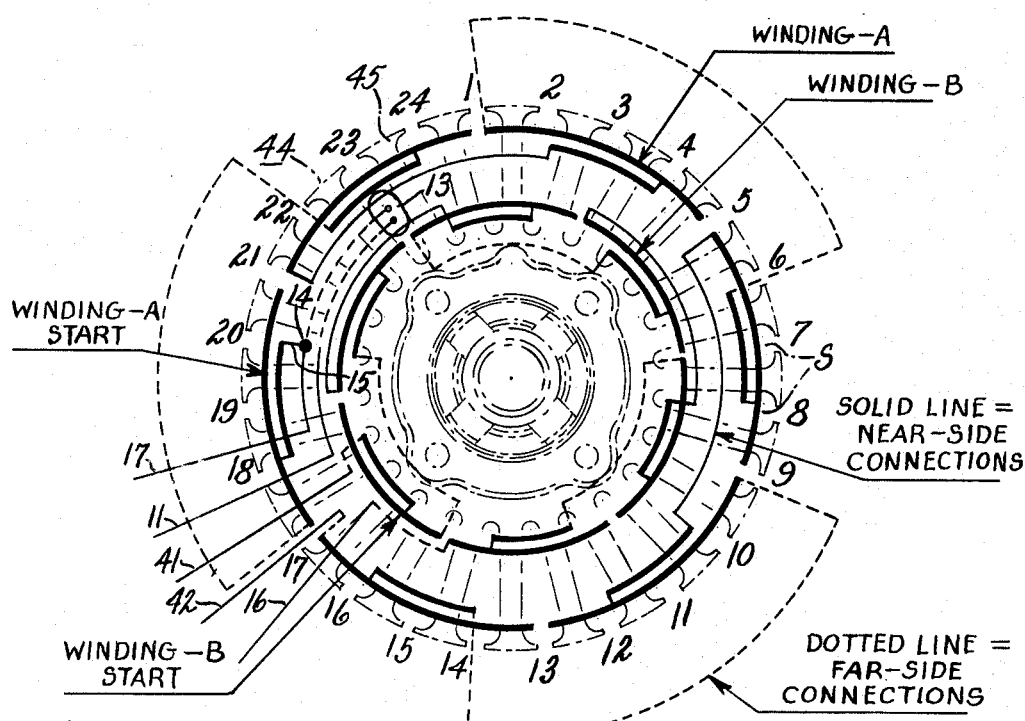
FIGURE 3 illustrates a connection diagram for the single speed motor means of FIGURE 2 and includes an outline of slotted stator means fitted with concentric coils of winding portions A and B for dual speed operation in accordance with the present invention.
FIGURE 4 is a chart presenting a resume of number of turns and wire size as an example of use of a single speed winding arrangement for dual speed operation.

FIGURE 2 illustrates the motor means 40 having five insulated sizes or lead connections including those identified by reference numerals 11, 16, 17, 41 and 42 corresponding to circuit connections in the wiring diagram of FIGURE 1. Suitable terminal means can be attached to ends of these wires or lead connections to facilitate installation thereof with the switch means 20 and it is to be understood that similar terminal means can be provided on the leads 24 and 26 extending from opposite ends of the capacitor means 25. The motor means 40 can include a stationary mounting face 43 of a frame or housing in which a magnetic stator core 44 is supported having radially outwardly extending teeth 45 defining slots S arbitrarily numbered 1 through 24 inclusive as indicated in the view of FIGURE 3.

These slots S arbitrarily numbered 1 through 24 inclusive can be installed in accordance with a disclosure of copending application Ser. No. 737,590, Needham, filed May 26, 1958, and belonging to the assignee of the present invention. Structural details of the motor means 40 for use as a fan means and the like can be physically similar to a disclosure of Patent 2,990,112, Levy et al., on a ventilating means, issued June 27, 1961, and belonging to the assignee of the present invention. Thus, the journalling of the rotor R having a shaft therewith extending at least on one side of the motor means 40, as indicated in FIGURE 2, is not being described in any further detail in this disclosure. Use of a fluidized-bed plastic encapsulation of the stator 44 including the teeth 45 and slots S can provide effective insulation for placement of winding portions A and B, including at least a pair of concentric coils for each of several poles which can be in accordance with a representation of FIGURE 3 in which reference numerals corresponding to those of FIGURES 1 and 2 are applied to insulated wiring or lead connections identified earlier. It is to be understood that the winding portion A collectively includes a plurality of pairs of concentric coils serially connected to each other as indicated by solid lines representing near-side connections and dotted lines representing far-side connections in the end view represented by FIGURE 3. Similar solid and dotted line connections representing near and far sides of the wound stator for winding portion B also including a plurality of concentric coils in pairs can also be seen in FIGURE 3. As an example of details as to winding portions A and B which can be machine inserted to the stator slots S, reference can be made to a chart of FIGURE 4 indicating differing American wire gage sizes #27 and #28, respectively, as well as differing numbers of turns for each of the concentric coils in pairs representing winding portions A and B. In the chart of FIGURE 4 it is noted that reference is made to the number of turns for inner coils of each of the six portions of winding A to have 130 turns. Similarly, the six outer coils of these corresponding six interconnected segments of winding portion A can each be provided with 85 turns and a #27 A.W.G. wiring is used throughout winding portion A for this example. Similarly, winding portion B has each of the inner concentric coils provided with 110 turns and each of the outer concentric coils provided with 105 turns of #28 A.W.G. wiring. It is to be understood that in place of concentric coils for each of these winding portions A and B it is also possible to use single stage windings having differing numbers of turns, differing wire size or both. In any event, for the example given, the inner coils of the winding portion A can be fitted into arbitrarily numbered slots for a span extending from slots 2–4, 6–8, 10–12, 14–16, 18–20, and 22–24. The outer coils belonging collectively to winding portion A and located concentrically to have ends thereof one slot beyond ends of the inner coils such that the outer coils fit into arbitrarily numbered slots 1–5, 5–9, 9–13, 13–17, 17–21, and 21–1 as indicated in FIGURE 3.

With reference to winding portion B, it is to be understood that inner concentric coils of the six segments shown for the sample can each have 110 turns whereas the outer concentric coils each have 105 turns of wire size #28 A.W.G. The inner coils can be fitted into slots correspondingly arbitrarily numbered 4–6, 8–10, 12–14, 16–18, 20–22, and 24–2 whereas the outer coils of the winding portion B can be fitted into slots numbered 3–7, 7–11, 11–15, 15–19, 19–23, and 23–3 as can be seen in the view of FIGURE 3. The overload protector 13 can be wedged in a location intermediate winding portions A and B in a suitable space in one of the slots such as number twenty-three in FIGURE 3. The specific details and arrangement of the overload protector means 13 can be taken as optional though reference can be made to a disclosure of a copending application Ser. No. 93,392, Pleiss et al., filed March 6, 1961, on a protector mounting.

Again referring to FIGURE 1, it is noted that swinging the switch arms 31, 32 and 33 to the left for low speed operation results in engagement of junctures 29, 35 and 39, respectively, to obtain one speed-versus-torque characteristic by connection of the supply line 12 to the capacitor line 26 at one end of the capacitor means 25. For the other speed-versus-torque characteristic the switch arms 31, 32 and 33 are shifted to the right in the illustration of FIGURE 1 for establishing contact with junctures 23, 38 and 36, respectively, during high speed operation wherein the supply line 12 is connected to lead wire 24 on an opposite side of the capacitor means 25. Simultaneously the supply line 11 remains connected to the winding portions A and B at an end thereof remote from the connection to the capacitor means 25. In effect, there is a triangular connecting relationship at all times as to winding portion A, winding portion B and the capacitor means 25 except that the applied voltage from the source of power is supplied to alternate sides of the capacitor means 25. If it is desired to maintain the same direction of rotation, connection to either winding portion may be reversed. For counter-clockwise rotation the leads 11, 16, 17, 41 and 42 are connected as shown in FIGURE 1. For clockwise rotation the lead end connections 11, 16 and 17 remain as shown and an interchange of wiring leads 41–42 is made as to the junctures 36–38, respectively.

It is apparent that the same winding portions on the same motor can be used both for single and two speed operations when the switching means 20 and capacitor means 25 are added to the motor means 40. Without the addition of this switching means and capacitor means the motor means can be used having the winding portion A as a main winding and the winding portion B as an auxiliary or phase-starting winding in a well-known manner. Only one type of motor means can serve the purpose of both single and dual speed operation for manufacturers because by having the capacitor means in series at all times with a portion of the windings it is possible to utilize all components of the system actively to realize dual speed operation from a single speed motor means. During dual speed operation, all of the winding portions are active at all times and the capacitor means 25 is also active at all times in accordance with continued use and setting of the switch means 20. Thus, a pair of winding portions having different number of turns or wire size or both and a capacitor joined to one side of each thereof while an opposite side of each is connected to a source of power which optionally can be also connected to either side of the capacitor means permits multi-speed and/or reversible operation as described.

While the embodiments of the present invention as herein disclosed constitute a preferred form, it is to be understood that other forms might be adopted.

What is claimed is as follows:

1. A winding arrangement for use in a slotted stator magnetic core to permit dual speed operation with a single speed motor, comprising, first and second winding portions dissimilar as to each other in at least one of respective features in a group characteristically including wire size, number of turns of wire as well as both wire size and number of turns of wire as fitted into differing slots and having a juncture as to each other at one end thereof, a capacitor means connected across remaining opposite ends of said winding portions, and a switching means having contacts connected from power supply to said juncture of said first and second winding portions as well as alternately to opposite ends of said capacitor means for use thereof at all times during operation at differing speeds.

2. A winding arrangement for use in a slotted stator magnetic core to permit dual speed operation with a single speed motor, comprising, a multi-segmental pair of winding portions dissimilar as to each other in at least one of respective features in a group characteristically including wire size, number of turns of wire as well as both wire size and number of turns of wire as fitted into predetermined shared slots and having a juncture as to each other at one end thereof, a capacitor means connected across remaining opposite ends of said winding portions, and a switching means having contacts connected from power supply to said juncture of said first and second wire portions as well as alternately to opposite ends of said capacitor means for use thereof at all times during operation at differing speeds.

3. An arrangement of components to permit operation of a single speed motor means at differing speed-versus-torque characteristics, comprising, first and second winding portions dissimilar as to each other in at least one of respective features in a group characteristically including wire size, number of turns of wire as well as both wire size and number of turns of wire as fitted into predetermined motor stator slots, capacitor means connected into triangulated delta-like relation with said winding portions, and switching means having contacts connected from power supply always to juncture between said winding portions and alternately to said capacitor means at opposite ends thereof whereby said components are all used during differing speeds of operation.

4. The arrangement of claim 3 wherein said switching means is a three-pole double-throw device having three intermediate junctures as well as three low speed and three high speed junctures at least four of which are cross connected in pairs to maintain juncture of said winding portions at one end thereof in a location remote from alternate power supply connection to said capacitor means.

5. The arrangement of claim 3 wherein interchange of only a pair of leads to one of said winding portions by change of lead to contact engagement respectively of said switching means effects a reversal of motor rotation.

6. An arrangement of components, in combination, comprising, a single speed motor means which permits multi-speed operation having first and second winding portions dissimilar as to each other in at least one of respective features in a group characteristically including wire size, number of turns of wire as well as both wire size and number of turns of wire as fitted into predetermined shared slots and having a juncture as to each other at one end thereof, a capacitor means connected between opposite remaining ends of said winding portions, and a switching means having contacts connected from power supply to said juncture and alternately to opposite ends of said capacitor means for use of all components at all times at differing speed-versus-torque performance.

7. The arrangement of claim 6 wherein said motor means has a twenty-four-slot magnetic stator core in which one said winding portion has coil spanning slots arbitrarily numbered 1–5, 5–9, 9–13, 13–17, 17–21 and 21–1 and said remaining winding portion has coil spanning slots correspondingly arbitrarily numbered 3–7, 7–11, 11–15, 15–19, 19–23 and 23–3.

8. The arrangement of claim 6 wherein said motor means has a twenty-four-slot magnetic stator core in which each of said winding portions includes a plurality of segments each having at least a pair of concentric coils, outer coils of said first winding portion spanning slots arbitrarily numbered 1–5, 5–9, 9–13, 13–17, 17–21 and 21–1, inner coils of said first winding portion spanning slots arbitrarily numbered 2–4, 6–8, 10–12, 14–16, 18–20 and 22–24, outer coils of said second winding portion spanning slots arbitrarily numbered 3–7, 7–11, 11–15, 15–19, 19–23 and 23–3, inner coils of said second winding portion spanning slots arbitrarily numbered 4–6, 8–10, 12–14, 16–18, 20–22 and 24–2.

9. The arrangement of claim 6 wherein said winding portions are dissimilar only as to wire size.

10. The arrangement of claim 6 wherein said winding portions are dissimilar only as to number of turns of wire.

11. The arrangement of claim 6 wherein said winding portions are dissimilar both as to number of turns as well as wire size.

12. For use as a ventilator fan operable at differing speeds on a furnace, air conditioner and similar ventilating equipment, an arrangement of components, comprising, a single speed motor means which permits multi-speed operation having first and second winding portions dissimilar as to each other in at least one of respective features in a group including wire size, number of turns of wire as well as both wire size and number of turns of wire as fitted into predetermined shared slots and having a juncture as to each other at one end thereof, a capacitor means connected between opposite remaining ends of said winding portions, and a switching means having contacts connected from power supply to said juncture and alternately to opposite ends of said capacitor means for use of all components at all times at differing speed-versus-torque performance.

13. The arrangement of claim 12 wherein said motor means has an inside-out stator-rotor configuration in which the stator has radially outwardly open slots into which said first winding portion is located outwardly from said second winding portion.

14. The arrangement of claim 12 wherein said motor means has an inside-out stator-rotor configuration in which the stator has radially outwardly open slots into which said first winding portion is located outwardly from said second winding portion, and an overload protector means is fitted in a location intermediate said first and second winding portions.

References Cited by the Examiner

UNITED STATES PATENTS

| | | | |
|---|---|---|---|
| 2,117,123 | 5/1938 | Werner | 318—221 |
| 2,547,599 | 4/1951 | Roters | 318—166 |
| 2,549,265 | 4/1951 | Trant | 318—221 X |
| 2,743,406 | 4/1956 | London | 318—221 X |
| 2,795,712 | 6/1957 | Suhr | 310—202 X |
| 2,807,765 | 9/1957 | Suhr | 310—220 X |
| 2,813,239 | 11/1957 | La Cour | 318—221 |
| 2,847,629 | 8/1958 | Schaefer | 318—221 X |

ORIS L. RADER, *Primary Examiner.*

C. E. ROHRER, G. Z. RUBINSON, *Assistant Examiners.*